Patented Oct. 20, 1942

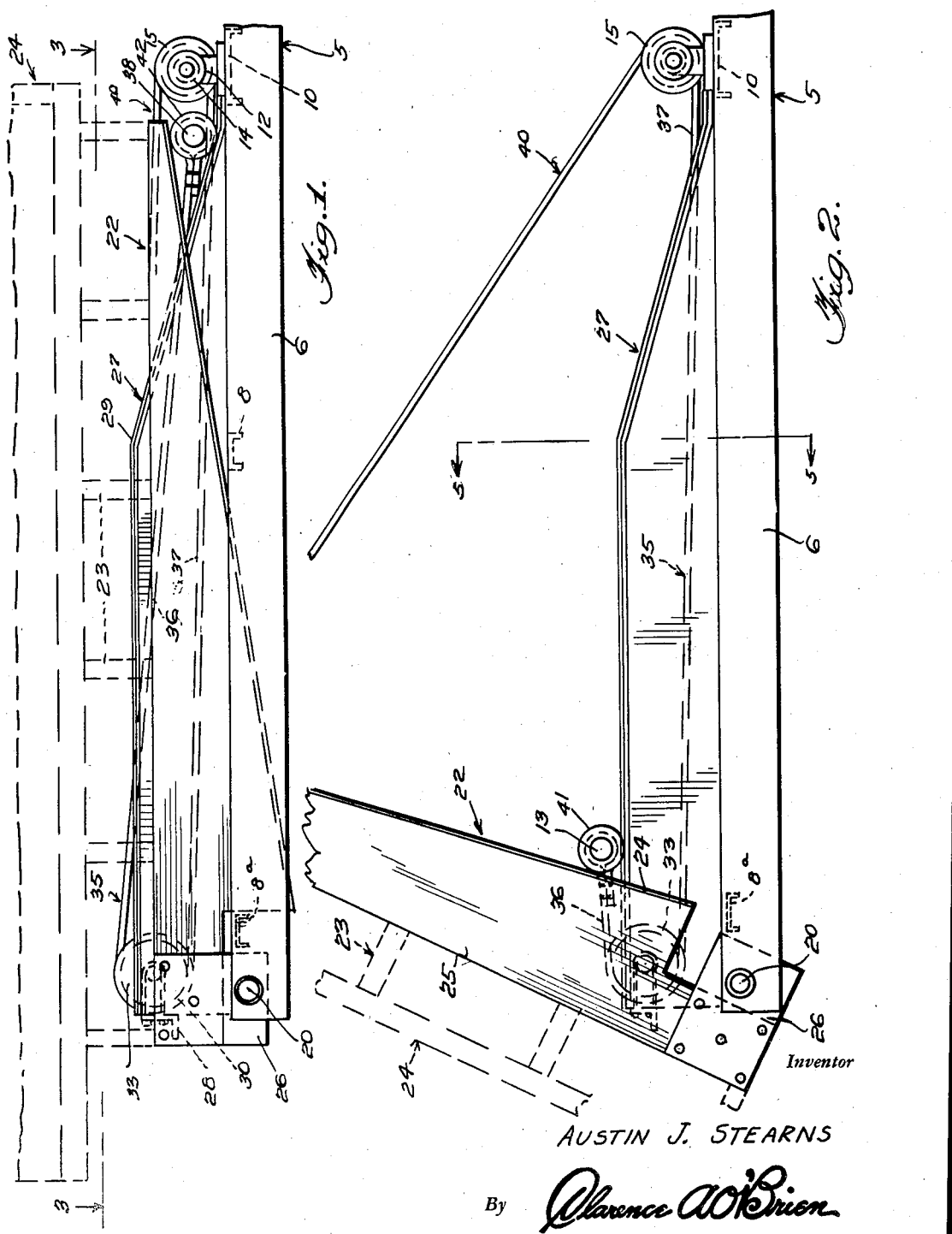

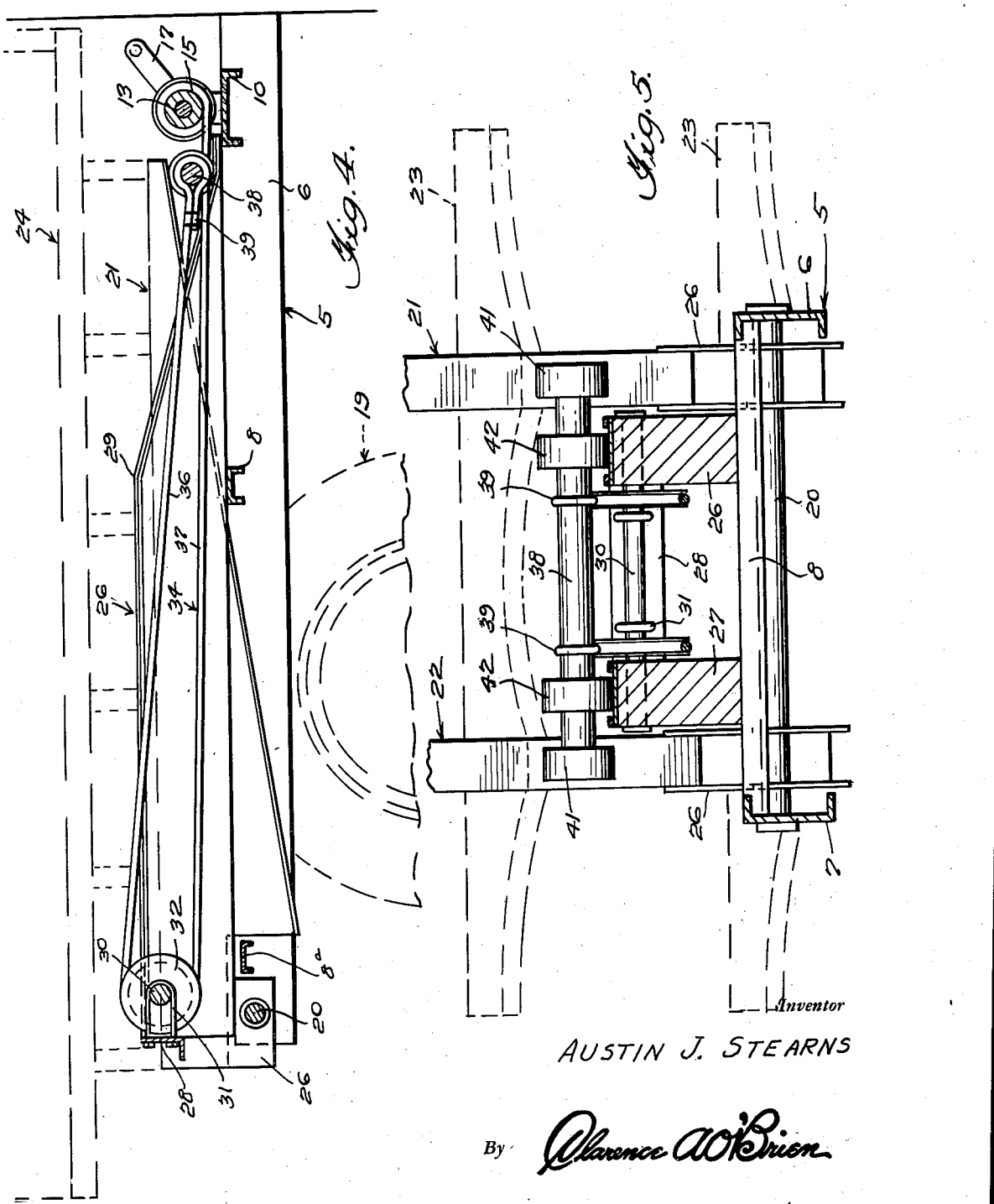

2,299,187

UNITED STATES PATENT OFFICE 2,299,187

DUMP BODY LIFT OR THE LIKE

Austin J. Stearns, Seffner, Fla.

Application November 10, 1941, Serial No. 418,558

6 Claims. (Cl. 298—19)

My invention relates to improvements in lifting means for the dump bodies of trucks and the like, and the primary object of my invention is to provide a simplified, more efficient, and less expensive arrangement of the character indicated.

Other important objects and advantages of my invention will be apparent from a reading of the following description taken in connection with the appended drawings, wherein for purposes of illustration I have shown a preferred embodiment of my invention.

In the drawings:

Figure 1 is a general side elevational view of the embodiment showing the dump body in horizontal normal position.

Figure 2 is a fragmentary side elevational view showing the dump truck body in the tilted or elevated or lifted position.

Figure 4 is a longitudinal vertical sectional view taken through Figure 3 along the line 4—4 looking upwardly in the direction of the arrows.

Figure 5 is an enlarged fragmentary transverse vertical sectional view taken through Figure 2 along the line 5—5 and looking toward the left in the direction of the arrows.

Figure 3:
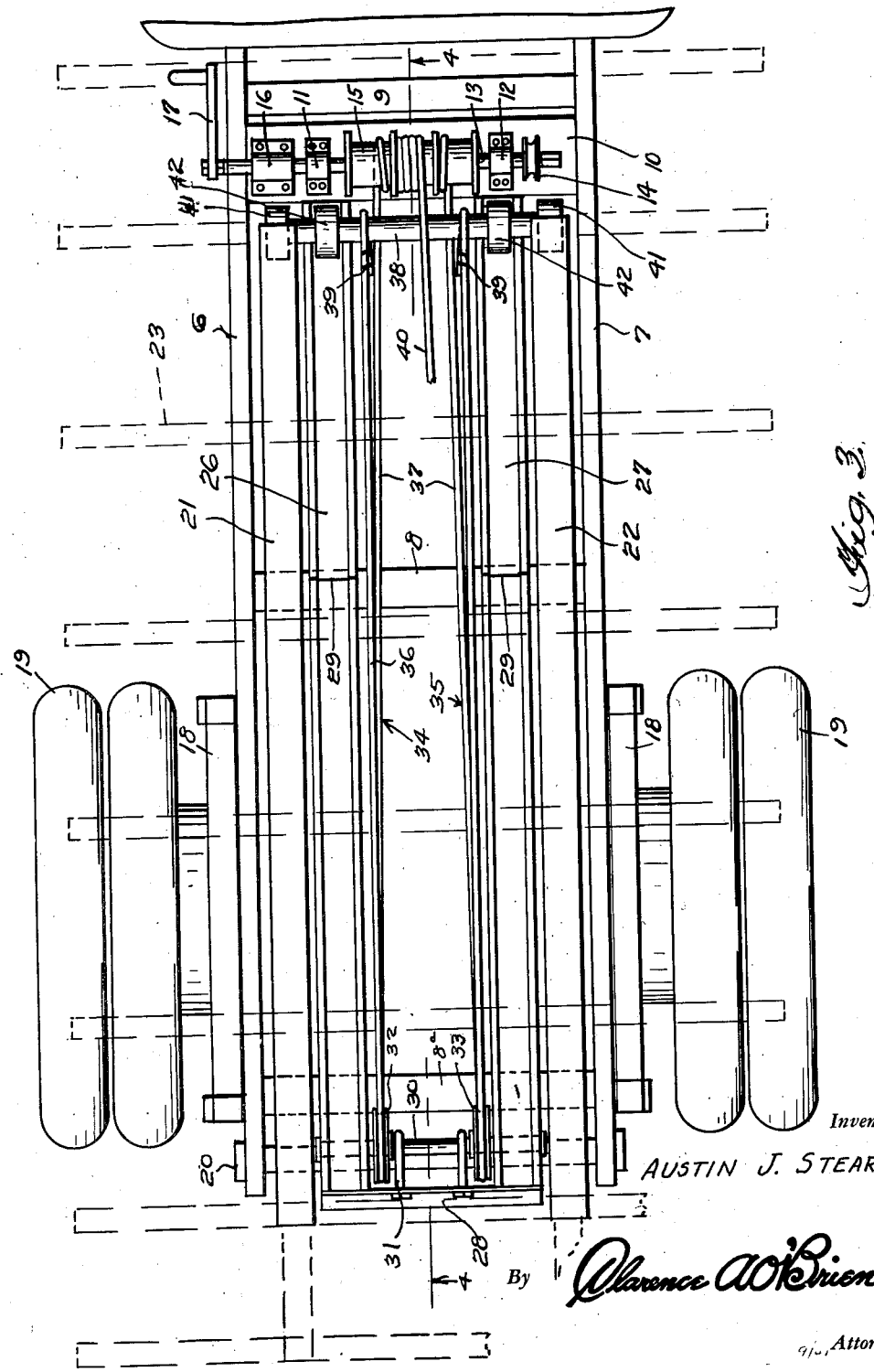
Figure 3 is a general horizontal sectional view taken along the line 3—3 of Figure 1 and looking downwardly in the direction of the arrows.

Referring in detail to the drawings, the numeral 5 generally designates a relatively stationary horizontal support, like, but not necessarily the chassis of an automobile truck or the like, consisting essentially of side rails 6 and 7 spaced and connected by transverse cross members 8, 8a and 9, with an additional transverse support element 10 adjacent the front cross member 9. Mounted transversely on the element 10 is a pair of bearings 11 and 12 in which turns the shaft 13 which has at its right hand end a drive pulley 14 and has fixed thereto between the bearings the triple drum 15. The left hand end of the shaft 13 passes into a gear box 16 whose gears are operated by a hand crank 17 disposed for operation along the left hand side of the chassis 5, as clearly indicated in Figure 3 of the drawings. Power drive may be substituted for the hand crank 17.

The said chassis or the like may be conventionally supported at its rear end on springs forming a part of the under carriage on which are mounted the ground engaging wheels 19. A pivotal cross member 20 mounted between the rear ends of the chassis side members 6 and 7 has pivoted thereon the rear ends of the dump body side rails 21 and 22, the latter having mounted thereon the longitudinally spaced transversely extending bolsters 23 on which the usual dump body or other material supporting means, generally designated 24 would be mounted in a conventional manner. As indicated in Figures 1 and 2, the dump body side rails 21 and 22 are relatively deep at their rear ends as indicated by the numeral 24, from which point the lower edges of the said side rails taper upwardly to almost meet the upper horizontal surface at the forward ends of the side rails. As observed in Figure 2, the rear ends of the side rails 21 and 22 are not directly mounted on the pivotal cross member 20 but upon brackets 26 which are attached to the rear ends of the side rails and have a depending portion journaled on the said pivotal member 20.

Disposed within the side rails 21 and 22 is a pair of channel top rails 26 and 27 which rest upon and are secured to the chassis cross members and are spaced and secured together at their rear ends by the transverse element 28 and the axle 30. From the point 28 to their front ends the channel rails 26 and 27 decline forwardly to a level just above the top of the transverse support 10, as clearly shown in Figure 4 of the drawings, and again in Figures 1 and 2 of the drawings. From the point 28 to the rear extremity of the channel rails, they are substantially horizontal and in general parallel with the top of the chassis 5.

Mounted transversely through the rear end portions of the channel rails 26 and 27 and forwardly of the rear cross element 28 in the axle 30 which is braced against forward displacement by transversely spaced U-bolts 31 which are fastened to the cross element 28 as shown in Figures 1, 3 and 4, the shaft 30 having on opposite sides of the said U-bolts relatively large pulleys 33 and 32, respectively, over which are trained individual cables which are respectively generally designated 34 and 35. The upper flights 36 of these cables are turned around the front operating shaft 38 and secured upon each other as indicated by the numeral 39 so as to have a secure operating connection with the shaft 38, while the lower flights 37 of these cables pass under the operating shaft 38 and are wrapped in a rearward direction around the side sections on the triple drum 15 as clearly shown in Figure 3 of the drawings. Another cable 40 is wrapped in the opposite direction around the central section of the drum 15, with its free end attached to the forward part of the dump body 24 for the purpose of pulling the dump body down into place after it has been lifted to the dumping position in a manner to be described.

The shaft 38 has freely revolubly mounted thereon at each side pairs of rollers 41 and 42, the rollers 41 rollably engaging the lower edges of the dump body side rails 21 and 22, and the rollers 42 rolling exclusively in the channels of the channel rails 26 and 27.

As indicated in Figures 1 and 4, the various rollers are in a sense in wedging relation to the rails 21 and 22 and the tracks 26 and 27, so that when the shaft 38 is carried rearwardly by the operation of the triple drum 15 through manipulation of the crank handle 17, the rollers 42 climb the incline of the tracks 26 and 27, while the outer rollers 41 wedge and push upwardly on the inclined lower edges of the side members 21 and 22. Since the tracks 26 and 27 are stationary the resultant of the movement of the shaft 38 is rise of the dump body to dumping positions such as that illustrated in Figure 2 of the drawings. The cable 40, due to the revolution of the drum 15 and properly proportioned diameter of the drum 15, follows the rise of the dump body so as to continually preserve the same from any overtopping; and when the dump body is to be drawn down again into normal load carrying position, the simple reversal of the rotation of the drum 15 by operation of the crank handle 17 will cause the cable 40 to pull the dump body down into the said position, while the other cables 34 and 35 operate to prevent the dump body from any harsh or unduly expedited return toward the load carrying position.

Although I have shown and described herein a preferred embodiment of my invention, it is to be definitely understood that I do not wish to limit the application of my invention thereto except as may be required by the scope of the subjoined claims.

Having described the invention, what is claimed as new is:

1. In combination, a substantially horizontal, relatively stationary base, an upwardly tiltable support normally lying along and resting on portions of said stationary base, hinge means connecting said support and base at one end to permit said tiltable support to be tilted upwardly, a pair of transversely spaced longitudinal tracks on said stationary base, the said tracks having declining portions adjacent the ends remote from said hinge means, a pair of longitudinal rails depending from said tiltable support alongside of said tracks and below said tracks, the lower edges of said rails being inclined from adjacent said hinge means to their opposite ends, a transversely arranged rolling wedge disposed across said rails and tracks and positioned between the inclined lower edges of said rails and the declining portions of the tracks, and operating means for moving said rolling wedge along said tracks toward said hinge means to elevate said tiltable support.

2. In combination, a substantially horizontal relatively stationary base, an upwardly tiltable support normally lying along and resting on portions of said stationary base, hinge means connecting said support and base at one end to permit said tiltable support to be tilted upwardly, a pair of transversely spaced longitudinal tracks on said stationary base, the said tracks having declining portions adjacent the ends remote from said hinge means, a pair of longitudinal rails depending from said tiltable support alongside of said tracks and below said tracks, the lower edges of said rails being inclined from adjacent said hinge means to their opposite ends, a transversely arranged rolling wedge disposed across said rails and tracks and positioned between the inclined lower edges of said rails and the declining portions of the tracks, and operating means for moving said rolling wedge along said tracks toward said hinge means to elevate said tiltable support, said rolling wedge comprising a shaft having separate and individually rotatable rollers rolling on the tracks and engaging the lower edges of said rails.

3. The combination recited by claim 1 wherein said operating means comprises a cable drum revolubly anchored on said base at the opposite end from said hinge means, cable pulleys anchored on a portion on said base adjacent said hinge means, cables trained over said drum and over said pulleys and having free ends secured to said rolling wedge, and drive means for turning said drum.

4. The combination recited by claim 1 wherein said operating means comprises a cable drum revolubly anchored on said base at the opposite end from said hinge means, cable pulleys anchored on a portion on said base adjacent said hinge means, cables trained over said drum and over said pulleys and having free ends secured to said rolling wedge, and drive means for turning said drum, and another cable trained over said drum in the opposite direction from the mentioned cable and having its free end attached to the elevated end of said tiltable support for restraining upward tilting of said support in its rise and pulling said support toward its horizontal position under restraint of the other cables in the subsiding action of said tiltable support toward the normal load carrying horizontal position.

5. The combination recited by claim 1 wherein said operating means comprises a cable drum revolubly anchored on said base at the opposite end from said hinge means, cable pulleys anchored on a portion on said base adjacent said hinge means, cables trained over said drum and over said pulleys and having free ends secured to said rolling wedge, and drive means for turning said drum, said drive means comprising a power pulley connected to said cable drum.

6. The combination recited by claim 1 wherein said operating means comprises a cable drum revolubly anchored on said base at the opposite end from said hinge means, cable pulleys anchored on a portion on said base adjacent said hinge means, cables trained over said drum and over said pulleys and having free ends secured to said rolling wedge, and drive means for turning said drum, said drive means comprising a hand crank operatively connected to said cable drum.

AUSTIN J. STEARNS.